June 19, 1934.    H. W. KRANZ    1,963,854
RIM
Filed Sept. 22, 1932
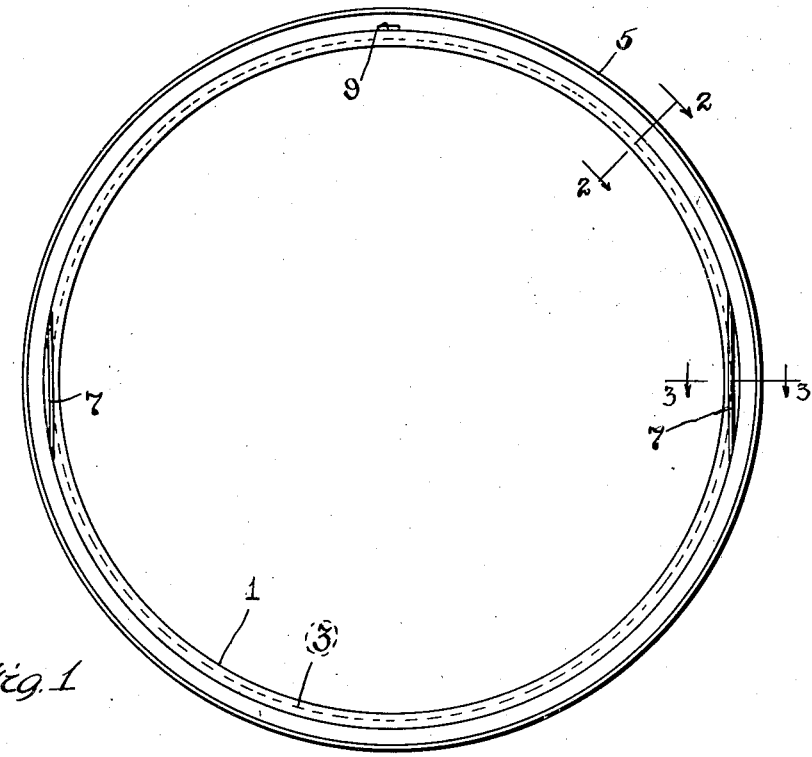
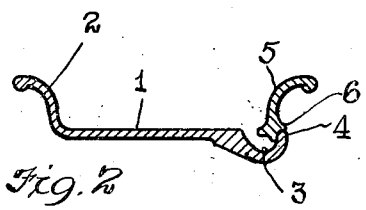
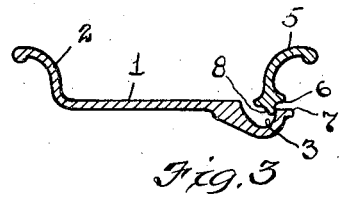
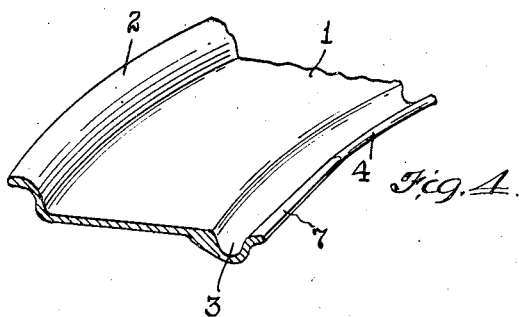
INVENTOR.
Harry W. Kranz
BY
Fay, Oberlin & Fay
ATTORNEYS.

Patented June 19, 1934

1,963,854

UNITED STATES PATENT OFFICE 1,963,854

RIM

Harry W. Kranz, Cleveland, Ohio, assignor to The Cleveland Welding Company, Cleveland, Ohio, a corporation of Ohio Application September 22, 1932, Serial No. 634,373

3 Claims. (Cl. 152—21)

This invention relates as indicated to rims and more particularly to rims for vehicle wheels adapted to removably support inflatable tires and the like. In order that the tire casing and its associated tube be properly maintained on its supporting rim it is necessary that such rim be provided with marginal outwardly projecting flanges to engage the bead of the tire. During the early development of the pneumatic tire, high pressures were usually employed to inflate the tube. Such high pressure large diameter tires permitted the use of a supporting rim structure formed of relatively thin stock and accordingly, somewhat flexible.

With the event of smaller wheel diameter low pressure tires, however, the strength of the rim structure supporting the same has had to be increased, not only due to the greater stress required to be carried incidental to a bulkier tire but also in order to insure a sufficient factor of safety for high speeds of vehicle operation.

In order to readily remove tires from rims it has become common practice to make one of the bead retaining flanges separable from the remainder of the rim structure. While this arrangement is most desirable, it has been met with some disfavor due to an inherent weakening in the structure by forming the same of two separate parts. Another objection to the use of a separable side ring for rims is the difficulty experienced in removing such ring from the rim preparatory to removing the tire.

It is among the objects of my invention to provide a rim structure for inflatable tires and the like characterized by the provision of a removable side ring of exceptional strength and durability and the combined assembly created in such manner that the side ring may be readily removed, provisions which do not weaken the strength of the composite structure. Other objects of my invention will appear as the description proceeds.

To the accomplishment of the foregoing and related ends, said invention, then consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:

Figure 1 is a side elevational view of a rim structure assembly constructed in accordance with the principles of my invention; Figure 2 is a transverse sectional view of the rim illustrated in Figure 1 taken on a plane substantially indicated by the line 2—2; Figure 3 is a transverse sectional view of the rim structure illustrated in Figure 1 taken on a plane substantially indicated by the line 3—3; and Figure 4 is a fragmentary perspective view of the portion of the rim in the area of line 3—3 in Figure 1.

Referring now more specifically to the drawing and more especially to Figure 1, the rim comprising my invention consists of a cylindrical body portion 1 at its rear side turned up into a rear bead supporting flange 2 against which the rear bead of the tire is forced when the tube therein is inflated.

Along the front edge of the rim is provided a trough generally indicated at 3, which, at its extreme outer edge is formed with an annular seat 4.

The front bead of the tire is laterally secured on the rim by means of a removable side ring, generally indicated at 5, which is provided with a seat 6 adapted to engage the seat 4 of the base. It is to be noted that the trough 3 is of such proportions that the ring 5 may be dropped into the trough on one side of the rim as the ring is preliminarily removed from the rim at a diametrically opposite point.

My invention relates more specifically to the formation of the rim and ring parts of the assembly whereby the removal of the side ring is greatly facilitated without a weakening of the combined structure in any way. This is accomplished by swaging or rolling down a portion generally indicated at 7, of the outer edge of the trough, more specifically the ring supporting seat 4 thereof at diametrically opposite points on the base member, as most clearly illustrated in Figures 1 and 4. The seat 4 is rolled or swaged down an amount such that when the side ring 5 is in proper assembled relation on the base, the lower edge 8 of such ring will engage the inner face of the depressed portion 7 for just a slight amount.

In order to facilitate the ready removal of the side ring from its assembled position on the rim, a so-called screw driver slot, generally indicated at 9, in Figure 1, is provided in one of the assembly members, specifically illustrated in the drawing as formed in the side ring.

When a tire is carried by the rim which is sought to be removed therefrom, the first step is to insert a screw driver or like instrument into the slot 9 and initially force the ring 5 inwardly off the seat 4 for a sufficient amount so that the rim at the lower portion of the assembly as viewed in Figure 1 may drop into the bottom of the trough 3. The ring 5 may then be removed by pivotal movement about its lowermost diametrical point and the depressed section 7 enables the ring to clear the seat 4 at the points on the rim 90° from such pivotal point. The rolling or swaging of the seat 4 in the manner specified is particularly desirable for the reason that no metal is removed but instead all of the original metal of the assembly is retained so that there is no weakening of the composite structure. Furthermore, the slight engagement of the ring with the edge of the trough, even in the swaged down portions, insures continuous engagement between the two members around the entire periphery, so that in this respect the structure is likewise not weakened by the modification which enables the side ring to be readily removed from the rim.

Other modes of applying the principle of my invention may be employed instead of the one explained, change being made as regards the mechanism herein disclosed, provided the means stated by any of the following claims or the equivalent of such stated means be employed.

I, therefore, particularly point out and distinctly claim as my invention:

1. In a vehicle wheel rim, the combination of a tire supporting member provided along one edge with an integral outwardly extending flange and along its other edge with a groove, a removable, endless, tire engaging flange, complementary seats on said removable flange and along one side of said groove, one of said seats being swaged down and relieved in local diametrically opposite areas.

2. In a vehicle wheel rim, the combination of an annular tire supporting member provided along one edge with a groove bounded along the outer side by a radial flange, a removable, endless, tire engaging flange provided with an annular seat adapted to engage said first named flange, the radial extent of said first named flange being swaged down in local diametrically opposite areas.

3. In a vehicle wheel rim, the combination of an annular tire supporting member provided along one edge with a groove bounded along the outer side by a radial flange, a removable, endless, tire engaging flange provided with an annular seat adapted to engage said first-named flange, the radial extent of said first-named flange being swaged down in local diametrically opposite areas, without entirely eliminating axial bearing between said flanges in such areas.

HARRY W. KRANZ.